United States Patent
Chandramouleeswaran et al.

(10) Patent No.: US 7,143,281 B2
(45) Date of Patent: Nov. 28, 2006

(54) METHOD AND APPARATUS FOR AUTOMATICALLY CHANGING KERNEL TUNING PARAMETERS

(75) Inventors: Aswin Chandramouleeswaran, Santa Clara, CA (US); Steven T. Roth, San Jose, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 684 days.

(21) Appl. No.: 09/977,043

(22) Filed: Oct. 12, 2001

(65) Prior Publication Data

US 2003/0074551 A1   Apr. 17, 2003

(51) Int. Cl.
G06F 9/00 (2006.01)
G06F 9/24 (2006.01)
G06F 9/445 (2006.01)
G06F 15/177 (2006.01)

(52) U.S. Cl. .............................. 713/100; 713/1; 713/2
(58) Field of Classification Search ................ 713/1, 713/2, 100; 709/220, 221, 222
See application file for complete search history.

(56) References Cited

U.S. PATENT DOCUMENTS

| 4,811,216 | A | * | 3/1989 | Bishop et al. ............... 711/153 |
| 6,075,939 | A | * | 6/2000 | Bunnell et al. .............. 717/107 |
| 6,112,301 | A | * | 8/2000 | Johnson ........................ 713/1 |
| 6,182,089 | B1 | * | 1/2001 | Ganapathy et al. .......... 707/206 |
| 6,718,464 | B1 | * | 4/2004 | Cromer et al. ................ 713/2 |
| 6,763,457 | B1 | * | 7/2004 | Aguilar et al. ................ 713/2 |

OTHER PUBLICATIONS

"Kernel Tunable Parameters", http://publib.boulder.ibm.com/infocenter/pseries/index.jsp?topic=/com.ibm.aix.doc/aixbman/prftungd/we65a82.htm, (pp. 1-7).

"Appendix A. Table of Tunable Kernel Parameters", http://docs.hp.com/en/TKP-90203/apa.html, (pp. 1-12).

"Dynamically tunable kernel parameters in hp-ux 11i", http://docs.hp.com/en/1316/DynTuneWP.pdf, *Jul. 2000*, (pp. 1-8).

"Kernel parameters", http://www.arm.linux.org.uk/armlinux/common/kernparams.html, (pp. 1-4).

* cited by examiner

Primary Examiner—James K. Trujillo (57) ABSTRACT

A method for operating a computing apparatus includes specifying proposed changes to a plurality of tunable parameters of tunable kernel modules determining whether application of the changes would violate a set of constraints; and effectuating either none or all of the changes depending upon whether the changes were determined to violate any or none of the constraints, respectively.

20 Claims, 4 Drawing Sheets

METHOD AND APPARATUS FOR AUTOMATICALLY CHANGING KERNEL TUNING PARAMETERS

FIELD OF THE INVENTION

The present invention relates to methods and apparatus for operating a computer and more specifically to methods and apparatus for managing the manner in which an operating system and its modules are tuned to improve computing performance.

BACKGROUND OF THE INVENTION

"Tunable parameters" (sometimes also referred to as "tunable variables" or simply "tunables") are variables that affect the operation of an operating system kernel by setting table sizes and system thresholds, among other things. Tunable parameters also control characteristics of processes, files, and system activity, and thus provide a way in which operating system kernels can be optimized for particular computers or installation or usage circumstances. For example, a "maxusers" tunable parameter may be provided to adjust the size of tables, arrays, buffers, etc. to optimize system performance for the expected number of users on a system. System administrators will be familiar with the tunable parameters that optimize their operating system kernels to various computer systems, installation, and/or usage circumstances. In some instances, kernels are recompiled and relinked for tuning, and to add drivers and subsystems.

Many tunable parameters are related to each other by constraints. For example, the number of files each user is allowed to have opened must necessarily be less than the number of files allowed opened on the whole system. Administrators who wish to change related values must be careful to change the tunables in the proper order to avoid violating such constraints. This need for extra care makes tuning the system more difficult.

SUMMARY OF THE INVENTION

In one configuration, there is therefore provided a method for operating a computing apparatus that includes specifying proposed changes to a plurality of tunable parameters of tunable kernel modules determining whether application of the changes would violate a set of constraints; and effectuating either none or all of the changes depending upon whether the changes were determined to violate any or none of the constraints, respectively.

Another configuration provides a computing apparatus having a central processing unit and a memory, wherein the computing apparatus is configured to specify proposed changes to a plurality of tunable parameters of tunable kernel modules; determine whether application of the changes would violate a set of constraints; and effectuate either none or all of the changes depending upon whether the changes were determined to violate any or none of the constraints, respectively.

Yet another configuration provides a medium or media having machine-readable instructions recorded thereon configured to instruct a computing apparatus having a central processing unit and a memory to specify proposed changes to a plurality of tunable parameters of tunable kernel modules; determine whether application of the changes would violate a set of constraints; and effectuate either none or all of the changes depending upon whether the changes were determined to violate any or none of the constraints, respectively.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein.

The flow charts included herein do not necessarily represent a single thread of execution in a single computer process, but rather, in some instances, may represent a sequence of coordinated steps, events, or processes occurring in a plurality of threads. In addition, the flow charts herein should not be Interpreted as implying that no other events, steps or processes can occur between those explicitly represented in the drawings.

DETAILED DESCRIPTION OF THE PREFERRED EMBODIMENTS

The following description of the preferred embodiment(s) is merely exemplary in nature and is in no way intended to limit the invention, its application, or uses. Also, as used herein, "at least one of A or B" encompasses configurations comprising either A or B, and configurations comprising both A and B. In addition, a "memory" of a computing apparatus may comprise any appropriate type of primary or secondary storage, unless the type of memory is further specified. Examples of primary storage include cache memory, random access memory, and read only memory. Examples of secondary storage include hard disks, floppy diskettes, CD-ROMs and CD-RW. One skilled in the art would take into account whether a memory must be writable or need only be readable to determine whether a particular type of primary or second storage would be appropriate for a given use.

Figure 1:
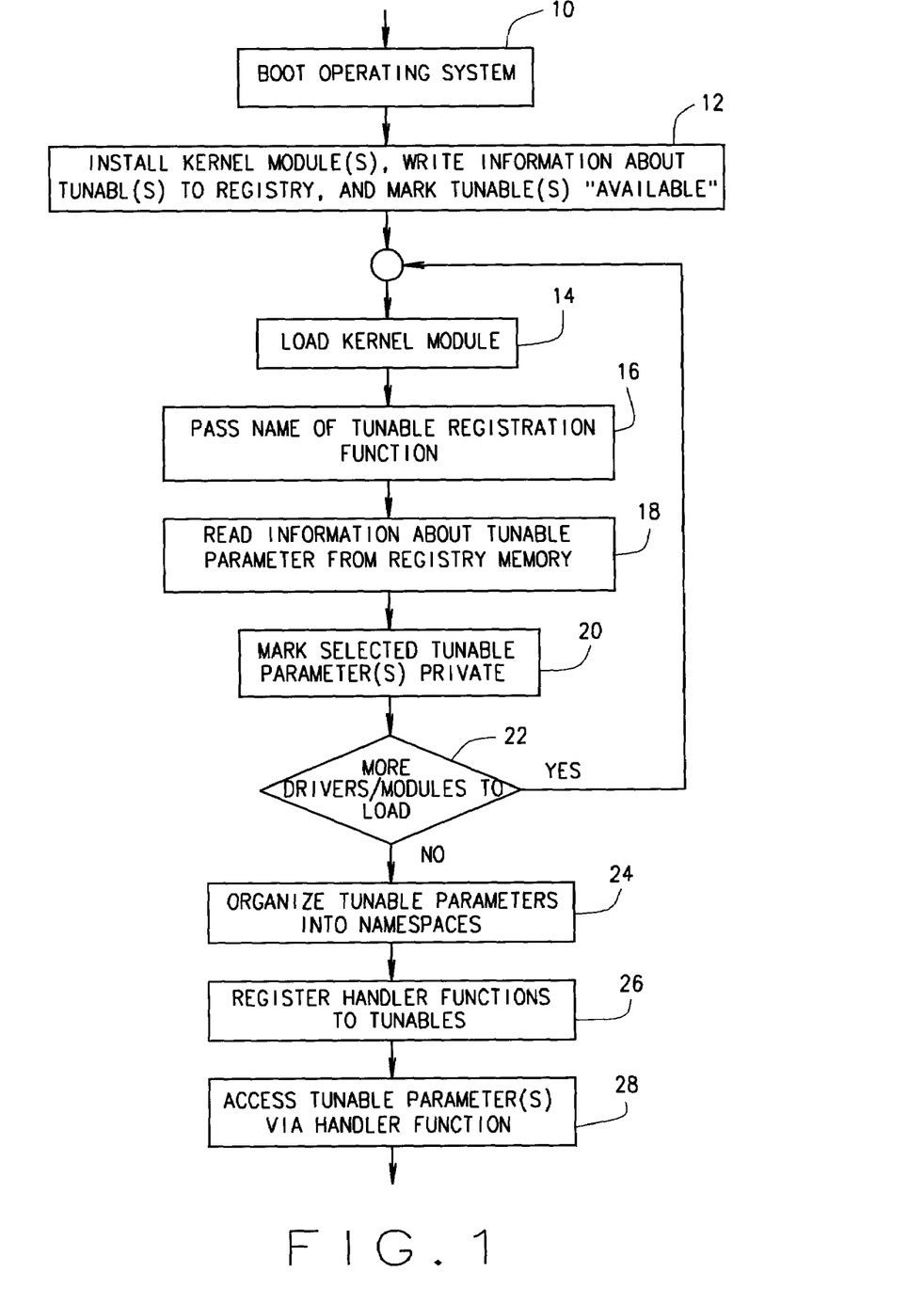
FIG. 1 is a simplified flow chart of one configuration of a registration process of the present invention.

In one embodiment and referring to FIG. 1, an operating system for controlling a computing apparatus (for example, a computer having a central processing system and a memory such as RAM) includes a kernel and one or more kernel modules. A "kernel module," as used herein, refers to a dynamically loadable kernel module, a subsystem within a kernel module, a driver, or another grouping of code that is run as a part of, or subsidiary to, the operating system kernel. One or more of the kernel modules have corresponding sets of one or more associated tunable parameters.

The computing apparatus is configured to initialize itself by booting 10 the operating system from a storage device such as a hard drive. The operating system includes a "tunable parameter registration function," which is a function that can be called by a kernel module to "register" a tunable, i.e., cause kernel-accessible information about the tunable to be read from a portion of memory maintained by the kernel as a "kernel registry." (The kernel registry can be in RAM or disk storage, or elsewhere, depending upon the operating system and the computing apparatus on which it is running.) In one configuration, the tunable parameter registration function is made available for use by kernel modules before any kernel module requires access to values of tunable parameters. The operating system also includes a plurality of kernel modules that are installed 12 during the boot process or as needed. At least some of kernel modules 12 are "tunable kernel modules" in that they have at least one tunable parameter and at least one handler function. For present purposes, no further consideration is given to kernel modules without at least one tunable parameter and handler function, However, the presence of kernel modules other than tunable kernel modules is not intended to remove any such configuration from the scope of the present invention.

Handler functions are configured to obtain (i.e., read) or change a value of a tunable parameter after the parameter is registered. In one configuration, some handler functions may be configured both to read and change a value of a tunable parameter, depending upon how it is invoked. Certain handler functions are configured in one configuration to be invoked with one or more arguments that specify a plurality of changes corresponding to a selected subset of registered tunable parameters. Other handler functions are configured to be invoked with an additional argument that specifies when a change requested by the handler function is to be effectuated.

To "install" a kernel module, information about the kernel module and its tunable parameters is read from a storage medium such as a CD-ROM or a hard drive, and the operating system kernel notes the existence of the module. Information about tunable parameters is written to the kernel registry by the operating system kernel, and the tunable parameters are marked as being "available." Information about the tunable parameter is, in one configuration, a data structure containing static information about the tunable parameter, such as name, one-line description, default value, etc. The tunable is marked as being available, in one configuration, by setting a bit that serves as an availability flag for the tunable parameter in the registry memory.

The first time a kernel module is loaded 14 into memory (as distinguished from being "installed"), it uses the registration function to register all of its tunable parameters. For example, core kernel modules register their tunable parameters at boot time, dynamically loadable tunable parameter modules register their tunable parameters at load time, and drivers register their tunable parameters at instance creation time. In registering tunable parameters, the kernel module passes 16 the name (or some other indication of identity) of its tunable parameter or parameters to the tunable registration function, which reads information about the tunable parameter from the registration memory. This information, which includes the value of the tunable parameter, is read 18 by the kernel module using the tunable parameter registration function. In addition, the kernel stores an indication that the tunable parameter(s) are available for at least one of read or write access. In one configuration, either the operating system kernel or the kernel module associated with a tunable parameter also provides a default value, an allowed range, and one or more dynamic and/or automatic tuning procedures for a tunable parameter upon registration.

In at least one configuration, some tunable parameters 20 are marked "private" in the kernel registry. The operating system kernel prevents unprivileged access to the private tunable parameters. (What constitutes "privilege" is defined by the operating system. For example, a privilege bit may be set for a user or an owner of a process,) If there are more drivers or kernel modules to load 22, more kernel modules are loaded 14, and the process described above repeats for each of them.

In one configuration, registered tunables are organized 24 into a plurality of namespaces, so that tunables from different kernel modules that share the same name are distinguishable. Handier functions used to access the tunable parameters are registered 26 to the tunables. Thus, at a later time, when a kernel module requires access to a tunable parameter (e.g., to read a value that may have been changed, or to write a new value for the tunable, if it is permitted to do so), that kernel module can access 28 its tunable parameter or parameters via the handler function.

Each kernel module having one or more tunable parameters provides one or more handler functions for its tunable parameters. A "handler function" is a function that performs a call to the operating system kernel to access (i.e., read or write) one or more tunable parameters. Thus, in one configuration, tunable parameters are accessed 28 via handler functions rather than by reading system tables. In one configuration having more than one kernel module, a first kernel module can load itself, register its one or more tunable parameters, and access its one or more tunable parameters, a second kernel module can do the same, as can others.

Although the examples herein generally describe only kernel modules as accessing tunable parameters utilizing handler functions, the handler functions may be made available to other programs that access tunable parameters. For example, a user with administrator privileges may access tunable functions through an administration program. In one configuration, the operating system kernel itself registers its own tunables and accesses them through handler function calls.

In the configuration represented in FIG. 1, tunable parameter values are not compiled into the operating system kernel, but are instead stored in a kernel registry that is maintained by the operating system kernel. In one configuration, all information about tunable parameters is stored in the kernel registry, including any supplied default values, allowed ranges, descriptions, and help text. This help text is available for software tools to use for on-line display when a user or a system administrator displays or alters the values of a tunable parameter. In another configuration, full online help text is omitted to reduce memory required for storage.

Figure 2:
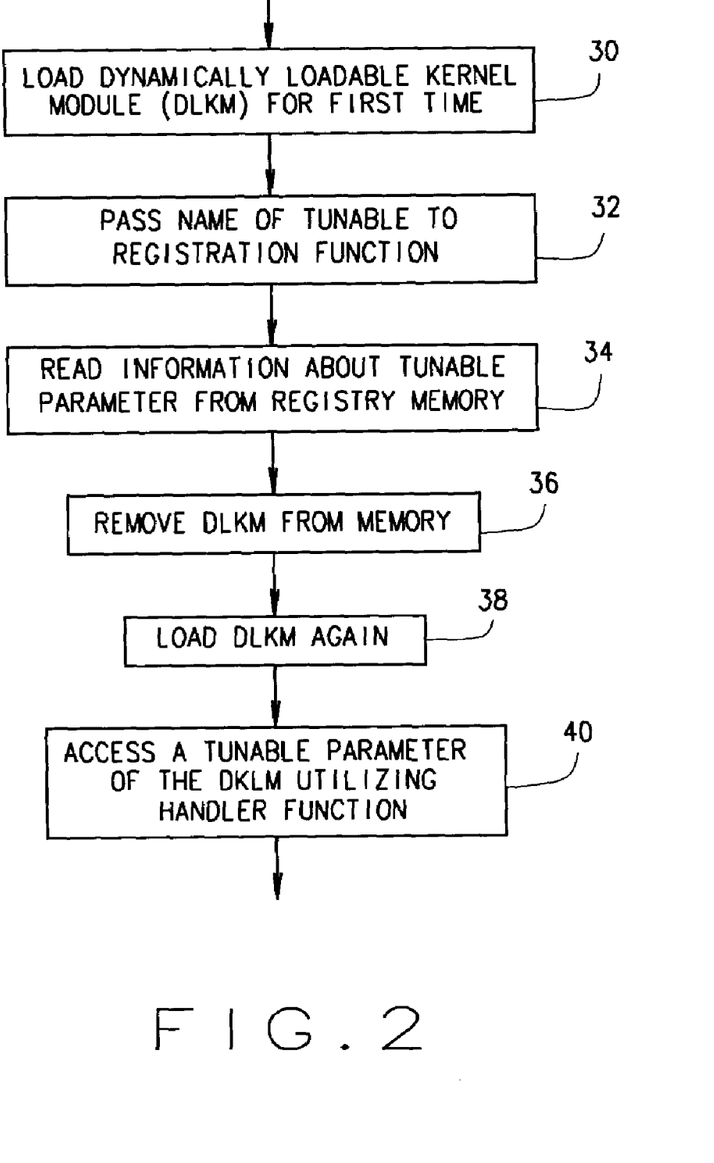
FIG. 2 is a flow chart showing a process for loading a dynamically loadable kernel module (DLKM) and registering and accessing its tunable parameters.

Although kernel modules having tunable parameters may all be loaded at boot time, it should be understood that there is no requirement for doing so. Moreover, kernel modules can be dynamically loadable, i.e., loadable and unloadable, as needed. Thus, in one configuration, once a dynamically loadable kernel module (DLKM) has been installed, it can be loaded 30 for the first time, as represented in FIG. 2. The DLKM registers 32 its tunable parameters by passing the name of each tunable parameters to the tunable parameter registration function, which reads 34 the value of each tunable parameter from the registry memory. The DLKM uses the value of the tunable parameter read in this way.

Tunable parameter registration entries for the DLKM are retained in memory even if the DLKM is subsequently removed 36 from memory. The tunable parameters remain In the kernel registry and information about the tunable parameters are preserved indefinitely in case the DLKM from which the tunable parameters were registered is ever reloaded 38. In this case, the tunable parameters are not registered a second time. Further access 40 to the tunable parameters is via a DKLM handler function using information about the tunable parameters of the DKLM retained in the registry memory from the first time the DKLM was loaded.

Figure 3:
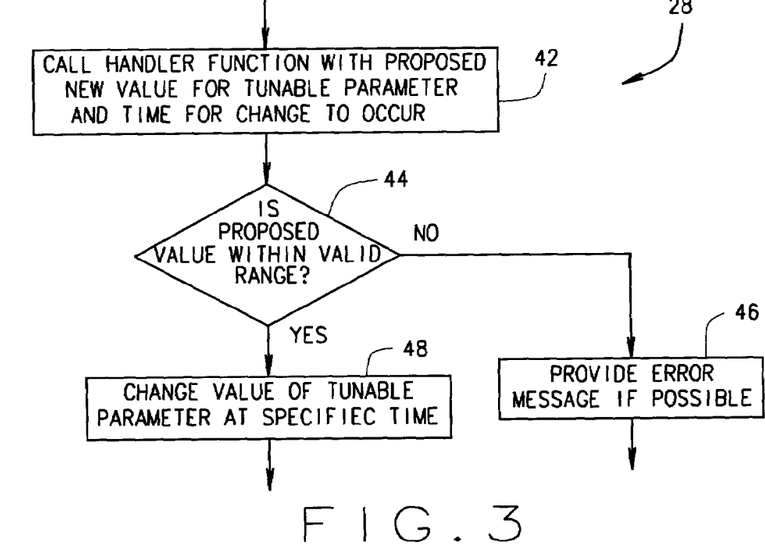
FIG. 3 is a flow chart providing additional details of one configuration of the tunable parameter access procedure referred to in FIG. 1.

In one configuration and referring to FIG. 3, a handler function accesses a tunable parameter and determines, from information made available from operating system kernel function calls, whether a specific value change in a tunable parameter is permissible. More particularly, to access a tunable parameter (28 in FIG. 1) a kernel module calls 42 a handler function with a proposed new value for a tunable parameter. Also in one configuration, the kernel module provides the handler function with requested time at which the operating system kernel is to effect the change in the value. The handler function determines 44 from information made available from the operating system kernel, whether the proposed value is within a predetermined valid range or is a member of a set of predetermined values. For example, the handler function may make this comparison itself within the kernel module, or the operating system may return a flag based upon a comparison of the proposed value with limits for the tunable parameter stored in the registry If the proposed value is not within the valid range, no change is made to the tunable value in the registry. In addition, an error message (which, in one configuration, is obtained from the help text associated with the tunable parameter in the registry) is displayed 46, if it is possible to do so, or a flag or other argument is returned to the calling program to indicate the error For example, an administration program may display an error message on a console if an administrator attempts to use the program to set an invalid tunable value. On the other hand, if the proposed change is validated, the value of the tunable parameter is changed 48 by the operating system kernel. If a time for the change to occur was specified, the change is stored in a buffer until the proper time. For example, a selection of times is provided in one configuration, including an immediate change, a delayed change, and a change after a system reboot.

In one configuration, there are three types of tunable parameters, namely, static, dynamic and automatic, depending upon when they can be changed. Static tunable parameters are tunable parameters that can be changed only by rebooting. Kernel modules or drivers with static tunable parameters register these tunable parameters at boot time. Thereafter, the registering kernel module can query the values of the static tunable parameters and save the values in variables local to the module. The value of the tunable parameter will never be changed while the kernel module or driver is running, so the registered tunable parameter need not be queried again and the locally stored copy of the tunable parameter value can be referred to indefinitely. A handler function is provided for static tunable parameters, but the handler function cannot change the value of static tunable parameters without a reboot. Handler functions for static tunable parameters can, however, determine whether a new value is valid (e.g., within a valid range) and, if so, write the value to storage so that the change is effectuated after a reboot occurs.

Dynamic tunable parameters can be changed at will. In addition to handler functions that query the value of dynamic tunable parameters, modules with dynamic tunable parameters contain handler functions that are called whenever a request is made to change the value of registered dynamic tunable parameters.

Automatic tunable parameters can be changed at will and have handler functions similar to those of dynamic tunable parameters. However, in addition to (or in place of) any changes to a dynamic tunable parameter that a kernel module may make, the operating system kernel itself is able to change automatic tunable parameters in response to changing system conditions. Handler functions are called to query the values of automatic tunable parameters.

Other tunable parameter variables that have automatic tuning procedures that need not or should not be overridden by an administrator need not be considered as tunable parameters, and in one configuration, are not treated as such.

Figure 4:
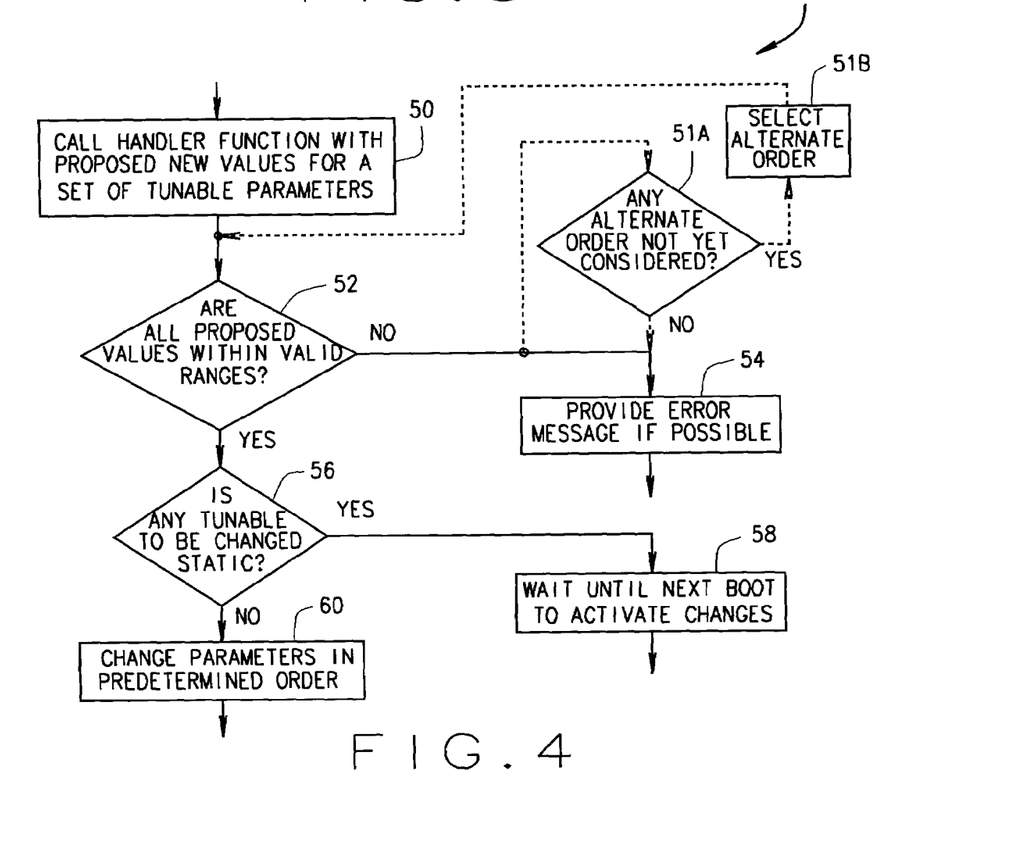
FIG. 4 is a flow chart providing additional details of another configuration of the tunable parameter access procedure referred to in FIG. 1.

Thus, in one configuration and referring to FIG. 4, a handler function is provided that can be called with set of proposed values for a specified subset of corresponding tunable parameters. The handler function is invoked 50 with the proposed new values. A determination is made 52 as to whether all of the proposed new values are within predetermined valid ranges of the corresponding tunable parameters. (The predetermined valid range may, in general, be different for each tunable parameter in the set. In one configuration, one or more additional checks are performed on the proposed new value or values. For example, a check is performed to determine whether the computer has sufficient physical resources such as memory to accommodate a value change.) If not all of the values are within their respective valid ranges (or any additional check fails), an error message is provided 52 if possible, and none of the proposed changes is made to the tunable parameters. Also in one configuration, it is determined 54 whether any of the specified set of tunable parameters is a static tunable parameter. If so, the entire set of changes is stored in a buffer other than the registry and the changes are made effective 56 (i.e., written from the buffer to the registry so that the are returned to handler functions attempting to read one or more of the tunable parameters) only after the next boot of the operating system. Otherwise, all of the changes to the values of the tunable parameters are made effective at the same time, or in a predefined order 58. (By "predefined order," it is meant that changes to the subset of tunable parameters are effectuated in a specific order, for example, an order required by constraints imposed by the operating system kernel.) In another configuration not shown in FIG. 4, invocation 50 of the handler function includes providing one or more arguments to the handler function that specify an order in which the proposed new values are to take effect. Whether or not a specified order is permissible is verified in one configuration before allowing the change to take effect. In yet another configuration not shown in FIG. 4, invocation 50 of the handler function includes providing one or more arguments to the handler function that specify a time at which the proposed new values are to take effect. For example, an argument may be provided that specifies that the entire set of changes is to be stored in a buffer other than the registry and the change made effective 56 only after the next boot of the operating system, even if none of the tunable parameters to be changed is a static tunable parameter.

Because tunable parameters may be functions of one another, one tunable may be initialized to a value that depends upon the value of one or more other tunable parameters. In such a state, a desired change to a single tunable parameter may result in changes to the values of many more tunable parameters at the same time. In one configuration, these dependencies are incorporated into the handler functions, which take care of processing all of the changes to tunable parameters so that all of the changes are effectuated at the same time. The configuration described above processes such transactions by ensuring that either none or all of the changes of a transaction proposing multiple changes to more than one tunable are effectuated. There is no middle ground for such transactions. In addition, no duplicate changes are allowed within a transaction, i.e., no more than one change to the same attribute or property of a tunable parameter is allowed per transaction. However, no restriction is imposed on the order in which the tunable parameters are specified in a transaction. If any of the tunable parameters in a transaction require a reboot to take effect, then the entire transaction requires a reboot for the changes to be effectuated.

By separating changes to the tunable parameters into three phases, namely validate, prepare, and commit, it is possible to ensure that all of the changes are valid when applied together, all of the changes are prepared to be applied together, and all of the changes are actually applied together.

To take maximum advantage of tunable parameters, the operating system kernel registers all tunable parameters and queries their values at boot time. Tunable parameter values are not compiled into the kernel. In configurations in which a previously-existing kernel is being updated, default values and range limits of the tunable parameters are reviewed and, if necessary, these default values and ranges are updated to appropriate values. In addition, tunable parameters that are no longer needed are removed.

Tunable parameters that are not intended to be visible to users of the kernel (as opposed to kernel developers) are marked "private" in the tunable parameter registry so that they cannot be viewed or changed by unauthorized individuals or programs. Existing applications that query the values of tunable parameters but do not set them can continue to do so, but should, and in one configuration, must be changed so that handler functions are used.

In some cases, one or more tunable parameters may change while an application is running, so applications should be configured to take into account this possibility. In one configuration, the operating system kernel prevents applications from editing tunable parameters in system files. Therefore, to change tunable parameters in this configuration, an application must use a tunable parameter handler function. In addition, applications that provide information about tunable parameters should use the information returned by a handler function that queries the kernel rather than by hard-coding such information, as not only the values of tunable parameters, but also the list of tunable parameters may change from one moment to the next. Therefore, in one configuration, an event notification procedure is provided to notify applications of tunable parameter value changes. In one configuration, all applications and kernel application program interfaces (APIs) dealing with tunable parameters utilize the same semantics, including the same names, allowed values, help text, visibility and modification characteristics.

Existing functions used to access tunable parameters should be modified to obtain information from the kernel rather than by accessing master files and system files directly. The kernel registry service is made available for both read and write at an early point as the kernel is booting, before the values of any tunable parameters are needed by modules or drivers.

Figure 5:
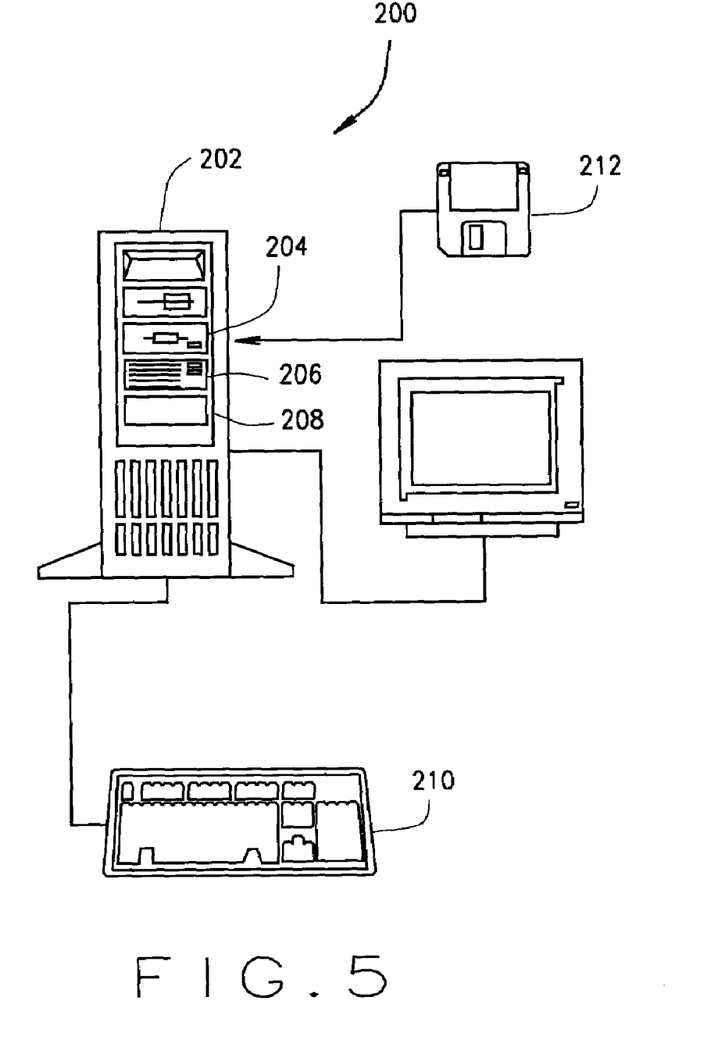
FIG. 5 is a block diagram of one configuration of a computing apparatus useful for performing the processes illustrated in FIGS. 1–4.

An example of a computing apparatus 200 configured to operate in accordance with the above description is represented in FIG. 5. Cabinet 202 houses a central processing unit (CPU) and associated random access memory (neither of which are shown separately in FIG. 5, but which are well-known in the art). In addition to random access memory, the CPU also communicates with other memory storage devices, for example, floppy disk drive 204, hard disk drive 206, and CD-ROM drive 208. In one configuration, the operating system is stored on hard disk drive 206 (or more generally, on one or more memory storage devices or media) and booted by the CPU when power is applied to computer system 200, when a switch is thrown on cabinet 202, when a command is issued from keyboard 210, or at other times in response to software or firmware instructions. To control the multiple processes and process threads, multiple thread schedulers and kernel modules are used. In one configuration, machine readable instructions configured to control computing apparatus 200 to execute the steps and procedures described herein are recorded on one or more media 212, for example, one or more floppy diskettes or CD-ROMS.

It will thus be seen that configurations of the present invention provide consistent, modular access to tunable parameters that is easily understood and implemented by system administrators as well as system and application programmers. Moreover, in configurations of the present invention providing value validation of proposed changes in tunable parameter values, an opportunity for error recovery is provided, and changes to groups of tunable parameters can be coordinated so that error conditions are avoided. More particularly, in one configuration, the present invention allows administrators to specify all tunable parameter changes at once without having to figure out order in which the changes must be applied to avoid violating constraints. Also in one configuration, a three-phase commit mechanism ensures that none of the changes will be applied unless all of them can be applied successfully. In FIG. 4, flow can proceed optionally (as indicated by dashed/phantom arrows) from block 52 to block 51A, where it is determined if there are any alternate orders that have not yet been considered. If so (YES), then flow proceeds to block 51B, where an alternate order is selected. From block 51B, flow loops back to block 52. If not (NO), i.e., no alternate orders remain, then flow proceeds to block 54.

The description of the invention is merely exemplary in nature and, thus, variations that do not depart from the gist of the invention are intended to be within the scope of the invention. Such variations are not to be regarded as a departure from the spirit and scope of the invention. Also, otherwise explicitly qualified (such as by reciting "only one" element or "no more than two" elements), claims that recite "one," "at least one," "one of," "a," or "an" element, or any specific number of elements are not intended to exclude embodiments having a greater number of elements than those recited.

What is claimed is:

1. A machine-implemented method for operating a kernel of a computing apparatus comprising:

receiving, from a user of the kernel, proposed changes to a plurality of tunable parameters of tunable kernel modules;

automatically determining whether application of the changes would violate a set of constraints, the determination including automatically evaluating one or more alternate orders by which the proposed changes can be effectuated to identify whether a valid order exists that would not violate the set of constraints; and effectuating either none or all of the changes depending upon whether the changes were determined to violate any or none of the constraints, respectively, the effectuation including using the valid order if such is identified by the automatically evaluating step.

2. A method for operating a computing apparatus comprising:

specifying proposed changes to a plurality of tunable parameters of tunable kernel modules;

determining whether application of the changes would violate a set of constraints;

effectuating either none or all of the changes depending upon whether the changes were determined to violate any or none of the constraints, respectively;

booting an operating system kernel having a tunable parameter registration function;

installing a plurality of kernel modules, wherein at least some of said kernel modules are said tunable kernel modules having at least one said tunable parameter and at least one handler function, said handler function configured to at least one of obtain or change a value of a registered tunable parameter, wherein installing said tunable kernel modules includes writing information about its at least one tunable parameter into a registry memory maintained by the operating system kernel and indicating that the at least one tunable parameter is available for at least one of read or write access; and using the tunable parameter registration function and the registry memory, registering the at least one tunable parameters of more than one kernel module;

and further wherein said specifying proposed changes to a plurality of tunable parameters comprises invoking one of said handler functions with a set of proposed new values for a corresponding selected subset of the registered tunable parameters;

wherein said determining whether application of the changes would violate a set of constraints comprises determining whether the proposed new values are valid for every tunable parameter in the selected subset of the registered tunable parameters; and wherein said effectuating either none or all of the changes comprises changing values of either every one or none of the selected subset of registered tunable parameters to the corresponding new values, conditioned upon a result of said determination of whether the proposed new values are valid.

3. A method in accordance with claim 2 wherein one of the tunable kernel modules is a dynamically loadable tunable module (DLKM), and further wherein registering the at least one tunable parameter of the DLKM is performed the first time the DLKM is loaded; said method further comprising:

removing the DLKM from memory;

maintaining the registration of said at least one tunable parameter of the DLKM while the DLKM is no longer in memory;

loading the DLKM into memory at least a second time; and accessing the value of at least one said tunable parameter of the DLKM using at least one said handler function, after the DLKM is loaded into memory at least a second time.

4. A method in accordance with claim 1 wherein effectuating all of the changes comprises changing the values of the plurality of tunable parameters in a predefined order.

5. A method in accordance with claim 1 wherein effectuating all of the changes comprises either rebooting the operating system kernel before effecting said changes or effecting said change prior to rebooting the operating system kernel, conditioned upon whether at least one of the tunable parameters is a static tunable parameter.

6. A method in accordance with claim 1 further comprising specifying a time at which said proposed changes are to be effectuated, and effectuating said proposed changes at the specified time.

7. A method in accordance with claim 1 further comprising specifying an order in which said proposed new values are to take effect, and effectuating the changes in the specified order.

8. A computing apparatus having a central processing unit, a memory and a kernel, said computing apparatus configured to:

receive, from a user of the kernel, proposed changes to a plurality of tunable parameters of tunable kernel modules;

automatically determine whether application of the changes would violate a set of constraints, the determination including operability to automatically evaluate one or more alternate orders by which the proposed changes can be effectuated to identify whether a valid order exists that would not violate the set of constraints; and effectuate either none or all of the changes depending upon whether the changes were determined to violate any or none of the constraints, respectively, the effectuation including operability to use the valid order to effectuate all of the proposed changes if such is identified by the automatic evaluation.

9. An apparatus in accordance with claim 8 wherein to effectuate all of the changes, said apparatus is configured to change the values of the plurality of tunable parameters in a predefined order.

10. An apparatus in accordance with claim 8 wherein to effectuate all of the changes, said apparatus is further configured to either reboot the operating system kernel before effecting said changes or effect said change prior to rebooting the operating system kernel, conditioned upon whether at one of the tunable parameters is a static tunable parameter.

11. An apparatus in accordance with claim 8 further configured to specify a time at which said proposed changes are to be effectuated, and to effectuate said proposed changes at the specified time.

12. An apparatus in accordance with claim 8 further configured to specify an order in which said proposed new values are to take effect, and to effectuate the changes in the specified order.

13. A computing apparatus having a central processing unit and a memory, said computing apparatus configured to:

specify proposed changes to a plurality of tunable parameters of tunable kernel modules;

determine whether application of the changes would violate a set of constraints;

effectuate either none or all of the changes depending upon whether the changes were determined to violate any or none of the constraints, respectively;

boot an operating system kernel having a tunable parameter registration function;

install a plurality of kernel modules, wherein at least some of said kernel modules are said tunable kernel modules having at least one said tunable parameter and at least one handler function, said handler function configured to at least one of obtain or change a value of a registered tunable parameter, wherein installing said tunable kernel modules includes writing information about its at least one tunable parameter into a registry memory maintained by the operating system kernel and indicating that the at least one tunable parameter is available for at least one of read or write access; and use the tunable parameter registration function and the registry memory, registering the at least one tunable parameters of more than one kernel module;

and further wherein to specify proposed changes to a plurality of tunable parameters, said apparatus is configured to invoke one of said handler functions with a set of proposed new values for a corresponding selected subset of the registered tunable parameters;

wherein to determine whether application of the changes would violate a set of constraints, said apparatus is configured to determine whether the proposed new values are valid for every tunable parameter in the selected subset of the registered tunable parameters; and wherein to effectuating either none or all of the changes, said apparatus is configured to change values of either every one or none of the selected subset of registered tunable parameters to the corresponding new values, conditioned upon a result of said determination of whether the proposed new values are valid.

14. A medium or media having machine-readable instructions recorded thereon configured to instruct a computing apparatus having a central processing unit, a memory and a kernel to:

receive, from a user of the kernel, proposed changes to a plurality of tunable parameters of tunable kernel modules;

automatically determine whether application of the changes would violate a set of constraints, instructions for the determination including instructions to automatically evaluate one or more alternate orders by which the proposed changes can be effectuated to identify whether a valid order exists that would not violate the set of constraints; and effectuate either none or all of the changes depending upon whether the changes were determined to violate any or none of the constraints, respectively, instructions for the effectuation including instructions to use the valid order to effectuate all of the proposed changes if such is identified by the automatic evaluation.

15. A medium or media in accordance with claim 14 wherein to effectuate all of the changes, said medium or media also includes machine-readable instructions configured to instruct the computing apparatus to change the values of the plurality of tunable parameters in a predefined order.

16. A medium or media in accordance with claim 14 wherein to effectuate all of the changes, said medium or media also includes machine-readable instructions configured to instruct the computing apparatus to either reboot the operating system kernel before effecting said changes or effect said change prior to rebooting the operating system kernel, conditioned upon whether at one of the tunable parameters is a static tunable parameter.

17. A medium or media in accordance with claim 14 further having machine-readable instructions configured to instruct the computing apparatus to specify a time at which said proposed changes are to be effectuated, and to effectuate said proposed changes at the specified time.

18. A medium or media in accordance with claim 14 further having machine-readable instructions configured to instruct the computing apparatus to specify an order in which said proposed new values are to take effect, and to effectuate the changes in the specified order.

19. A medium or media having machine-readable instructions recorded thereon configured to instruct a computing apparatus having a central processing unit and a memory to:

specify proposed changes to a plurality of tunable parameters of tunable kernel modules;

determine whether application of the changes would violate a set of constraints;

effectuate either none or all of the changes depending upon whether the changes were determined to violate any or none of the constraints, respectively;

load a tunable parameter registration function of a bootable operating system kernel;

install a plurality of kernel modules, wherein at least some of said kernel modules are said tunable kernel modules having at least one said tunable parameter and at least one handler function, said handler function configured to at least one of obtain or change a value of a registered tunable parameter, wherein installing said tunable kernel modules includes writing information about its at least one tunable parameter into a registry memory maintained by the operating system kernel and indicating that the at least one tunable parameter is available for at least one of read or write access; and use the tunable parameter registration function and the registry memory, registering the at least one tunable parameters of more than one kernel module;

and further wherein to specify proposed changes to a plurality of tunable parameters, said medium or media also includes machine-readable instructions configured to instruct the computing apparatus to invoke one of said handler functions with a set of proposed new values for a corresponding selected subset of the registered tunable parameters;

wherein to determine whether application of the changes would violate a set of constraints, said medium or media also includes machine-readable instructions configured to instruct the computing apparatus to determine whether the proposed new values are valid for every tunable parameter in the selected subset of the registered tunable parameters; and wherein to effectuating either none or all of the changes, said medium or media also includes machine-readable instructions configured to instruct the computing apparatus to change values of either every one or none of the selected subset of registered tunable parameters to the corresponding new values, conditioned upon a result of said determination of whether the proposed new values are valid.

20. A medium or media in accordance with claim 19 wherein one of the tunable kernel modules is a dynamically loadable tunable module (DLKM), and further wherein said registering the at least one tunable parameter of the DLKM is performed the first time the DLKM is loaded; said medium or media also having machine-readable instructions configured to instruct the computing apparatus to:

remove the DLKM from memory;

maintain the registration of said at least one tunable parameter of the DLKM while the DLKM is no longer in memory;

load the DLKM into memory at least a second time; and access the value of at least one said tunable parameter of the DLKM using at least one said handler function, after the DLKM is loaded into memory at least a second time.

* * * * *

UNITED STATES PATENT AND TRADEMARK OFFICE
CERTIFICATE OF CORRECTION

PATENT NO. : 7,143,281 B2
APPLICATION NO. : 09/977043
DATED : November 28, 2006
INVENTOR(S) : Aswin Chandramouleeswaran et al.

It is certified that error appears in the above-identified patent and that said Letters Patent is hereby corrected as shown below:

In column 4, line 17, delete "Handier" and insert -- Handler --, therefor.

Signed and Sealed this

Fourth Day of August, 2009

JOHN DOLL
*Acting Director of the United States Patent and Trademark Office*